Patented Mar. 6, 1934

1,949,928

UNITED STATES PATENT OFFICE 1,949,928

PROCESS OF MAKING COPPER SULPHATE FROM METALLIC COPPER AND ITS ALLOYS

Harry P. Corson, Lakewood, Ohio, assignor to The Grasselli Chemical Company, Cleveland, Ohio, a corporation of Delaware No Drawing. Application November 8, 1932, Serial No. 641,760

10 Claims. (Cl. 75—18)

The present invention relates to processes of making copper sulphate by the action of sulphur dioxide and oxygen in the presence of water upon metallic copper and its alloys and is particularly directed to the employment in this reaction of super-atmospheric pressures and elevated temperatures.

That copper or copper sulphate has a catalytic effect upon the reaction $$SO_2 + O_2 + H_2O + Cu \rightarrow CuSO_4 + H_2O$$

has already been shown in U. S. Patent 286,735, H. Rossler, Oct. 16, 1883. Patentee clearly emphasizes that this effect is only obtained when the copper is in a finely divided state such as "cement" copper. I have found that when copper is used in a compact form such as is available technically as scrap sheet copper, copper shot, copper filings, turnings, clippings, etc. practically no reaction takes place under ordinary conditions by the action of $SO_2$, $O_2$ and water thereon and the commonly used technical process for making copper sulphate from such scrap copper is to act on it with dilute, preformed sulphuric acid in the presence of air and steam. Even under such conditions the reaction is rather slow. This reaction is usually carried out by filling large towers or tanks with scrap copper and circulating dilute acid and air through the towers or tanks. This requires a large investment in copper metal as only a small proportion of the copper is dissolved at each passage of the acid. The production of copper sulphate directly from sulphur dioxide gas, as obtained from roasting of sulphid ores or by burning elemental sulphur would appear economically advantageous as the sulphur in the form of sulphur dioxide is cheaper than sulphur in the form of sulphuric acid.

I have found that the formation of copper sulphate from metallic copper in compact form, $SO_2$, and oxygen in the presence of water is greatly facilitated if the reaction is performed under super-atmospheric pressures and at elevated temperatures, for instance exceeding 100° C.

The performance of this novel reaction is not limited to the use of metallic copper but is also practically applicable to copper alloys, particularly those in which copper is alloyed with metals which are more electronegative than copper. The term electronegative is used herein in its modern sense as explained for instance in the 1919 volume of the Transactions Am. Electrochem. Soc. 36, pages 3–15. According to this nomenclature the alkali metals are in the electronegative end of the series of electromotive forces of the elements, the noble metals being the more electropositive ones.

The series of copper—zinc alloys known as brass and a series of copper—nickel alloys known as monel are particularly adapted for the recovery of their copper content by my novel process. They are available in large amounts as scrap metal and I do not know of any chemical process by which their metallic content could heretofore be directly converted with sulphur dioxide to a solution of their sulphates and be recovered. These alloys are in general less attacked by acids than is pure copper, but they are nevertheless easily transformed into sulphates by my process. The nickel, zinc or other metal alloyed with the copper is also dissolved and I obtain solutions of mixed sulphates which can then be separated by well known chemical means.

In operating my novel process, I introduce the metal in the form of scrap, clippings, turnings, etc. in an acid resisting autoclave or other pressure resisting vessel, cover the metal with water or a solution of the sulphate of the metal to be dissolved, such as is obtained in a subsequent step of my process, and introduce a compressed gas containing sulphur dioxide and oxygen. The reaction starts very slowly at room temperature and elevated pressure but increases markedly on heating, for instance from 65° C. on.

I therefor prefer to accelerate the reaction by heating, as for instance by introduction of live steam into the pressure vessel. Once the reaction is in full swing the energy liberated by the chemical reaction is sufficient to maintain it at the desired temperature and by regulating the exit of the pressure vessel the heat is sufficient to evaporate part of the water and to produce directly concentrated solutions of the sulphates. This represents a considerable saving over processes where cement copper is used without pressure or over processes where dilute sulphuric acid is allowed to attack copper at atmospheric pressure.

The exit line of the pressure vessel is controlled by a valve, the opening being such as to permit the inert gas to escape at a predetermined rate and at the same time to hold the pressure in the vessel to the desired value, the gases introduced are necessarily compressed to a slightly higher value. In compressing the sulphur dioxide gas it is necessary to provide means for the removal of moisture and sulphur trioxide as such impurities would corrode the compressing equipment. It is, of course, also possible to produce directly sulphur dioxide under pressure as is for instance disclosed in U. S. Patent 1,708,094, Apr. 9, 1929, H. Howard, and use this gas in my novel reaction.

A stationary pressure vessel consisting of a homogeneously lead lined, upright and narrow steel cylinder has been found particularly useful in operating my novel process as it allows an intimate and prolonged contact of the compressed gases with the metal.

For economical reasons I prefer the use of $SO_2$ gases as commonly used for the manufacture of sulphuric acid, as obtained by burning sulphur or by roasting sulphid ores. They usually contain sufficient oxygen to transform all the $SO_2$ present into $SO_3$ and such amounts are sufficient for an efficient operation of my process. In using $SO_2$ gases from other sources I add at least enough oxygen to correspond to the reaction $2SO_2+O_2=2SO_3$. Any excess oxygen is not detrimental. On the contrary it tends to further accelerate the reaction.

The pressure which I maintain in the reaction vessel by the use of compressed $SO_2$—oxygen gases is not necessarily that corresponding to saturated steam at the operating temperature but is preferably higher. Pressure and temperature are therefore independent. The reaction proceeds at an accelerated pace whenever the pressure is substantially above atmospheric, for instance above 25 lb. gauge, and the temperature above 100° C.

That the pressure of the sulphur dioxide gases has an accelerating effect upon the reaction is shown in a series of experimental operations in which a pressure tower of about 11 cu. ft. reaction space was partially filled with water and copper turnings; burner gases containing about 8% $SO_2$ and the necessary oxygen, but free from $SO_3$ or sulphuric acid, was introduced and the reaction mass kept at various temperatures and pressures:

| Pressure in the reaction vessel in lbs. per sq. in. gauge | Temperature in °C. | Rate of attack in lbs. Cu per hour |
|---|---|---|
| Atmospheric | 84 | Negligible |
| 28 | 97 | 1.58 |
| 60 | 117 | 3.83 |
| 61 | 115 | 3.76 |
| 67 | 136 | 8.00 |
| 70 | 142 | 10.68 |

In the experiments where the rate of attack was greater than 3 lb. Cu per hour the conversion of the $SO_2$ to copper sulphate was greater than 70%.

The result of similar operations on copper alloys are tabulated below:

| Pressure in the reaction vessel in lbs. per sq. in. gauge | Temperature in °C. | Rate of attack in lb. metal per hour |
|---|---|---|
| | Brass | |
| 65.5 | 140 | 7.7 |
| 66.3 | 125 | 10.0 |
| | Monel | |
| 65 | 121 | 4.4 |
| 65 | 124 | 4.9 |

The liquors obtained from such operations can be cooled whereby the crystalline mixed sulphates of copper and zinc in the case of brass and of copper and nickel in the case of monel are obtained. The mother liquors from such crystallizations are conveniently used as the reaction medium in which to carry out the attack of the metal with $SO_2$ and oxygen.

It is not necessary to carry out my novel reaction in batch operations. It can be operated in a continuous manner by circulating the liquor obtained over one or more towers filled with metal pieces while introducing compressed $SO_2$—O gases into the towers and maintaining therein the requisite temperatures and pressures.

I claim:

1. The process of producing the sulphate of a metal comprising copper which consists in acting upon said metal in compact form at elevated temperature and in the presence of water with a gas comprising sulphur dioxide and oxygen and maintaining said reaction mixture under super-atmospheric pressure.

2. The process of claim 1 in which the super-atmospheric pressure is greater than 25 lb. gauge and the elevated temperature greater than 100° C.

3. The process of producing copper sulphate which comprises acting upon compact metallic copper in the presence of water and at elevated temperature with a gas comprising sulphur dioxide and oxygen and maintaining said reaction mixture under super-atmospheric pressure.

4. The process of claim 3 in which the super-atmospheric pressure is greater than 25 lb. gauge and the elevated temperature greater than 100° C.

5. The process of producing metal sulphates which comprises acting upon a compact copper alloy in the presence of water and at elevated temperature with a gas comprising sulphur dioxide and oxygen and maintaining said reaction mixture under super-atmospheric pressure.

6. The process of claim 5 in which the super-atmospheric pressure is greater than 25 lb. gauge and the elevated temperature greater than 100° C.

7. The process of producing the sulphates of copper and zinc which comprises acting upon compact brass in the presence of water and at elevated temperature with a gas comprising sulphur dioxide and oxygen and maintaining said reaction mixture under super-atmospheric pressure.

8. The process of claim 7 in which the super-atmospheric pressure is greater than 25 lb. gauge and the elevated temperature greater than 100° C.

9. The process of producing the sulphates of copper and nickel which comprises acting upon compact monel metal in the presence of water and at elevated temperature with a gas comprising sulphur dioxide and oxygen and maintaining said reaction mixture under super-atmospheric pressure.

10. The process of claim 9 in which the super-atmospheric pressure is greater than 25 lb. gauge and the elevated temperature greater than 100° C.

HARRY P. CORSON.